(12) United States Patent
Cosatto

(10) Patent No.: US 9,811,735 B2
(45) Date of Patent: Nov. 7, 2017

(54) GENERIC OBJECT DETECTION ON FIXED SURVEILLANCE VIDEO

(71) Applicant: NEC Laboratories America, Inc., Princeton, NJ (US)

(72) Inventor: Eric Cosatto, Red Bank, NJ (US)

(73) Assignee: NEC Corporation, Tokyo (JP)

( * ) Notice: Subject to any disclaimer, the term of this patent is extended or adjusted under 35 U.S.C. 154(b) by 39 days.

(21) Appl. No.: 15/088,530

(22) Filed: Apr. 1, 2016

(65) Prior Publication Data

US 2016/0300111 A1 Oct. 13, 2016

Related U.S. Application Data

(60) Provisional application No. 62/146,570, filed on Apr. 13, 2015.

(51) Int. Cl.
*G06K 9/00* (2006.01)
*G06K 9/62* (2006.01)
*H04N 7/18* (2006.01)

(52) U.S. Cl.
CPC ..... *G06K 9/00718* (2013.01); *G06K 9/00771* (2013.01); *G06K 9/6254* (2013.01)

(58) Field of Classification Search
USPC ....... 382/100, 103, 106–107, 123, 154, 155, 382/162, 168, 173, 181, 209, 219, 224, 382/232, 254, 274–276, 286–295, 305, 382/312; 348/143
See application file for complete search history.

(56) References Cited

U.S. PATENT DOCUMENTS

| | | | |
|---|---|---|---|
| 2005/0094879 A1* | 5/2005 | Harville | G06K 9/00201 382/209 |
| 2008/0100704 A1* | 5/2008 | Venetianer | G06F 17/3079 348/143 |
| 2008/0273752 A1* | 11/2008 | Zhu | B60W 40/02 382/103 |
| 2013/0201330 A1* | 8/2013 | Thornton | H04N 7/18 348/143 |
| 2015/0146917 A1* | 5/2015 | Bernal | G06K 9/00771 382/103 |

* cited by examiner

*Primary Examiner* — Seyed Azarian
(74) *Attorney, Agent, or Firm* — Joseph Kolodka

(57) ABSTRACT

Systems and methods are disclosed for computer vision and object detection by extracting tracks of moving objects on a set of video sequences; selecting a subset of tracks for training; rendering a composite of each selected track into a single image; labeling tracks using the rendered images; training a track classifier by supervised machine learning using the labeled tracks; applying the trained track classifier to the remainder of the tracks; and selecting tracks classified with a low confidence by the classifier.

23 Claims, 3 Drawing Sheets

GENERIC OBJECT DETECTION ON FIXED SURVEILLANCE VIDEO

This application claims priority to Provisional Application 62/146,570, filed Apr. 13, 2015, the content of which is incorporated by reference.

BACKGROUND

The present invention relates to systems and methods for object detection in videos.

In the field of computer vision object recognition describes the task of finding and identifying objects in an image or video sequence. Humans recognize a multitude of objects in images with little effort, despite the fact that the image of the objects may vary a lot depending on the viewpoint. Objects may need to be recognized when they are partially obstructed from view. This task is still a challenge for computer vision systems. To train accurate classifiers, large amounts of data are required.

Many approaches to the task have been implemented over multiple decades. Typically the training data is human labeled. To provide training examples, an operator would normally have to watch long hours of video until a sufficient number of labeled examples are obtained to train a classifier. However, conventional systems do not emphasize the training aspects of classifiers from the operator's standpoint.

SUMMARY

In one aspect, systems and methods are disclosed for computer vision and object detection by extracting tracks of moving objects on a set of video sequences from a fixed surveillance camera; selecting a subset of tracks for training; rendering a composite of each selected track into a single image; labeling tracks using the rendered images; training a track classifier by supervised machine learning using the labeled tracks; applying the trained track classifier to the remainder of the tracks; and selecting tracks classified with a low confidence by the classifier.

One implementation accelerates the process of training a classifier by combining background subtraction, tracking and active learning. First, video sequences are preprocessed by the system to extract tracks of moving objects as they pass in front of the camera. The operator will then label some of these tracks. The labeling of a track can be done very quickly by the operator through the use of a composite image representing the track. Having multiple views of the object as it crosses the field of view makes it easier to recognize it quickly. Also, a single labeling action by the operator generates multiple image examples of the object itself. The tracking provides the bounding box of the objects automatically which greatly reduces the time needed for labeling (otherwise the operator would have to trace the bounding box manually). The object(s) of interest will be labeled positive (there may be more than one positive class) and the rest is labeled as negatives. Once a certain number of positive and negative examples are obtained, a classifier is trained. The trained classifier is then applied to video sequences that have not been labeled yet. If a track can be confidently classified it is discarded, otherwise it is presented to the operator for labeling. After a certain number of additional examples have been labeled, the classifiers are trained again and the process is repeated until an objective is reached.

Advantages of the system may include one or more of the following. Only examples for which the classifier is currently having difficulties are presented to the human labeler, therefore drastically reducing the time spent by the human operator at the labeling task. Faster operation is important in the field where operators are limited in numbers and are already busy with other surveillance tasks. The system makes it easy to quickly and accurately label large amounts of examples. The system accelerates the training process for object recognizers, thus reducing the time required for an operator to obtain a large amount of labeled examples, making fast deployment of surveillance applications possible.

DESCRIPTION

Figure 1:
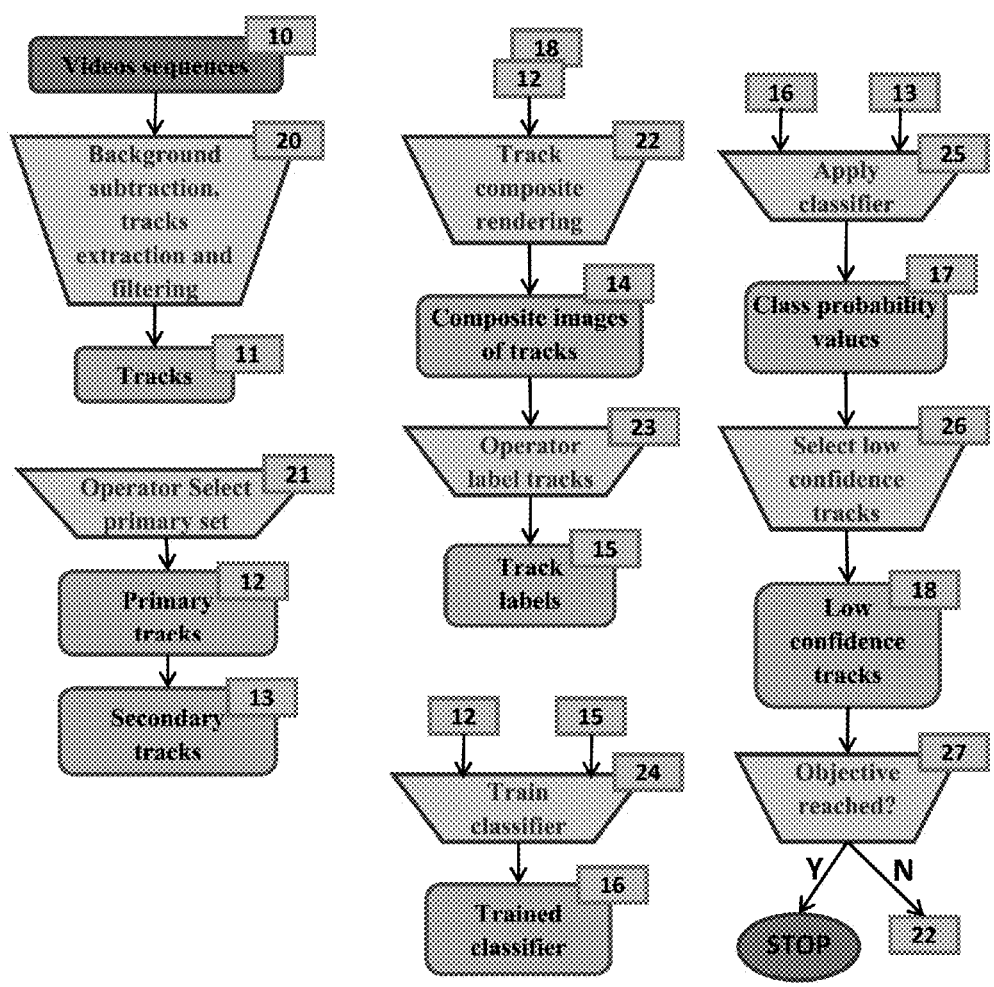
FIG. 1 shows an exemplary process for object detection.

Referring now to the drawings in which like numerals represent the same or similar elements and initially to FIG. 1, an exemplary process for object detection in videos is presented. The process provides a fast and efficient way to train a classifier to detect arbitrary objects passing in front of a fixed surveillance camera. The system applies operations including background subtraction on video streams of fixed cameras, object tracking, and object recognition on images and active learning to make a system that makes it easy and fast to train a classifier to recognize arbitrary objects passing in the field of view of a fixed video camera.

In this system, we first take advantage of the fact that the surveillance camera is fixed. In video footage [10] obtained from such fixed cameras, the objects of interest are moving across the field of view of the camera while the background is stationary for the most part. We can use background subtraction techniques to segment the moving objects on each video frame. Such methods learn the background through long observations and account for slow changes due to the sun moving and being obscured. Spurious movements such as foliage moving in the wind can also be removed efficiently. By subtracting the learned background from the current video frame, we are left with blobs of moving objects. Tracking these blobs as they move across the field of view can be achieved with object tracking methods. In most cases the tracking technique can disambiguate two or more objects that cross each other. Tracks can then be filtered to remove spurious tracks and the bounding box of the blobs can then be used in subsequent operations. These steps correspond to box [20] in the flowchart of FIG. 1.

Figure 3:
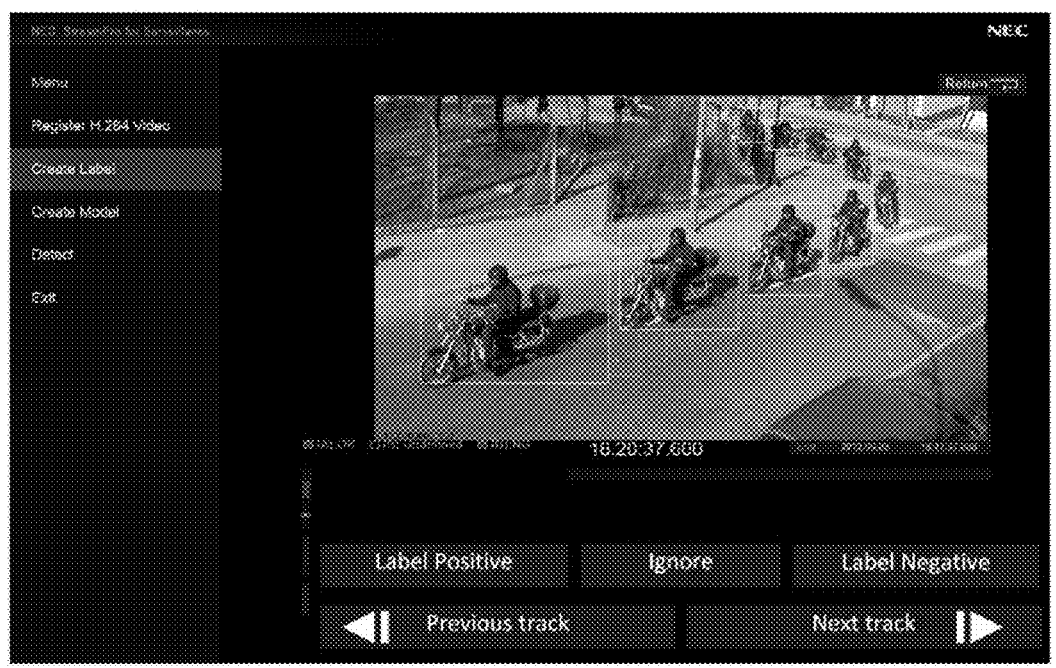
FIG. 3 shows an exemplary screenshot of the labeling GUI.

For the first phase of labeling, the operator selects [21] a set of video sequences. This is the original set [12]. The operator, instead of watching these video sequences—they often are several hours long and contain very few interesting parts—will instead only look at composite images [14] generated [22] by the system and representing an entire track, as shown on FIG. 3. The graphical user interface (GUI) depicted on FIG. 3 also allows the operator to label an entire track with a single click of the mouse in very little time—typically one second [23]. Hence an hour-long video sequence can thus be labeled in a few minutes. Without the tracking, such labeling would take much longer: the time it takes to watch the video plus the time to mark all bounding boxes.

Once the operator has labeled all tracks of the original set [15], a classifier can be trained [24] with those labeled examples. Any classifier can be used here that takes as input a track and as output produces a class label. Note that there can be any number of classes as long as sufficient numbers of examples for each class are present. One instance of such classifier is implemented as follows: a first classifier is trained to classify single objects from image bounding boxes and a second classifier is trained to classify tracks using the output of the first classifier for each object in the track combined with other features of the track itself (length, velocity, etc.). The first classifier's architecture can be, for example, a CNN working on raw image pixels or an SVM working on HoG (histogram of Gabor filters) features. The second classifier's architecture can be, for example an MLP or an SVM. The training procedure follows a typical cross-validation method to find the best hyper-parameters of the classifier.

Once the classifier is trained [16], it can be applied [25] to tracks extracted from other video sequences [13]. The tracks classified with the lowest confidence score [18] (such a value is readily available from the raw output of MLP or SVM classifiers and can be transformed to probabilities) are selected for labeling by the operator, as described above. In this way, the difficult to classify examples should be used to further train the classifier. Depending on the type of classifier used, different methods may be used to retrain it with the new examples. The simplest approach is to add the newly labeled examples to the training set and retrain from scratch. Other approaches may continue the training with the new examples.

These steps repeat as illustrated on FIG. 1 until the objective is reached [27] or the training data are exhausted. Upon repeating, the confidence threshold for selection of examples to label may be increased or new video sequences may be used. The objective may be any type of performance measure, such as a target F-score on an evaluation set.

Figure 2:
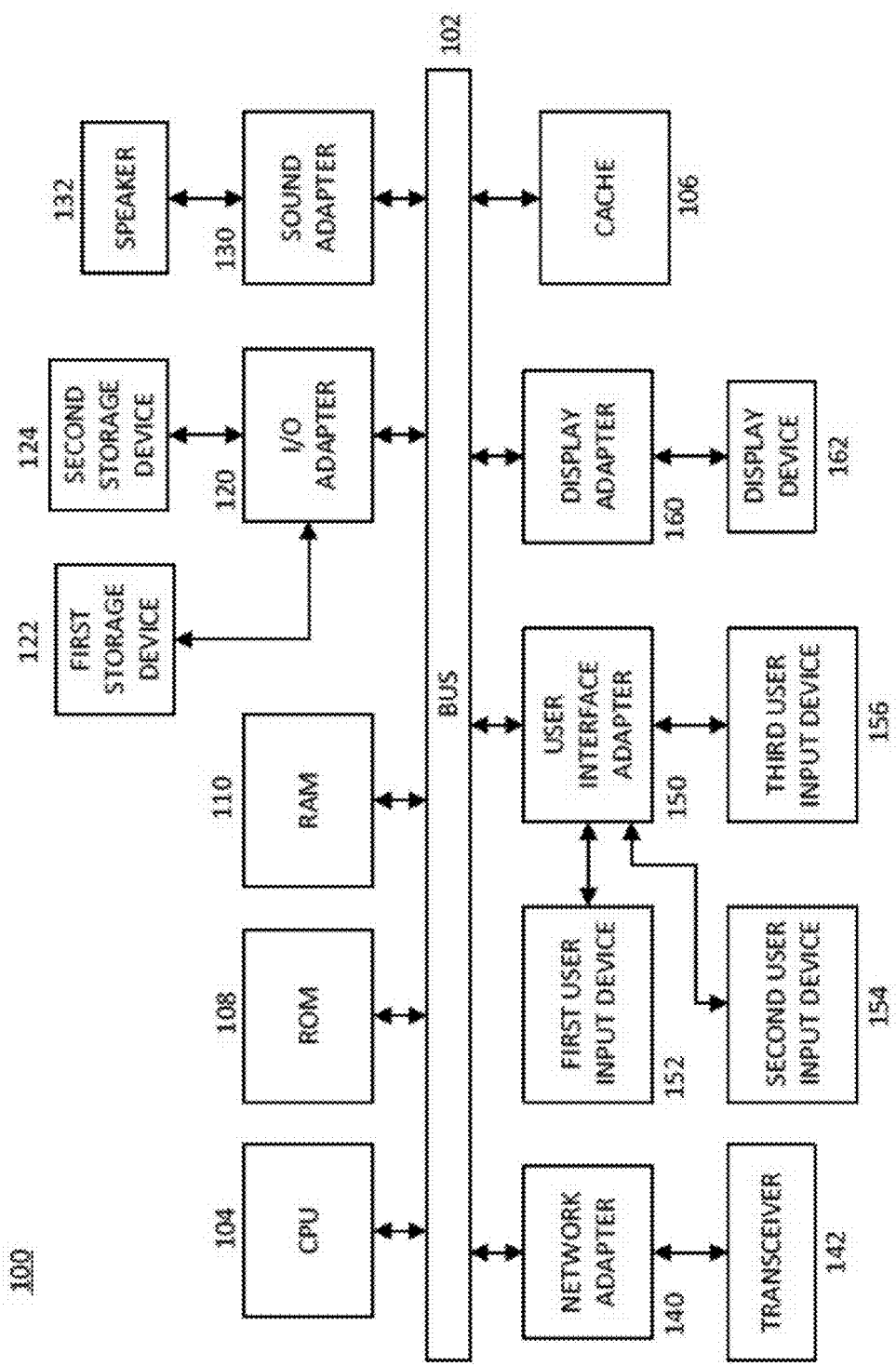
FIG. 2 shows an exemplary automotive computing system.

Referring now to FIG. 2, an exemplary video processing system 10, to which the present principles may be applied, is illustratively depicted in accordance with an embodiment of the present principles. The processing system 100 includes at least one processor (CPU) 104 operatively coupled to other components via a system bus 102. A cache 106, a Read Only Memory (ROM) 108, a Random Access Memory (RAM) 110, an input/output (I/O) adapter 120, a sound adapter 130, a network adapter 140, a user interface adapter 150, and a display adapter 160, are operatively coupled to the system bus 102.

A first storage device 122 and a second storage device 124 are operatively coupled to system bus 102 by the I/O adapter 120. The storage devices 122 and 124 can be any of a disk storage device (e.g., a magnetic or optical disk storage device), a solid state magnetic device, and so forth. The storage devices 122 and 124 can be the same type of storage device or different types of storage devices.

A speaker 132 is operatively coupled to system bus 102 by the sound adapter 130. A transceiver 142 is operatively coupled to system bus 102 by network adapter 140. A display device 162 is operatively coupled to system bus 102 by display adapter 160.

A first user input device 152, a second user input device 154, and a third user input device 156 are operatively coupled to system bus 102 by user interface adapter 150. The user input devices 152, 154, and 156 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present principles. The user input devices 152, 154, and 156 can be the same type of user input device or different types of user input devices. The user input devices 152, 154, and 156 are used to input and output information to and from system 100.

Of course, the processing system 100 may also include other elements (not shown), as readily contemplated by one of skill in the art, as well as omit certain elements. For example, various other input devices and/or output devices can be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 100 are readily contemplated by one of ordinary skill in the art given the teachings of the present principles provided herein.

Further, it is to be appreciated that processing system 100 may perform at least part of the methods described herein including, for example, at least part of method of FIG. 1.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention.

What is claimed is:

1. A computer vision system, comprising:
   automatically extracting tracks of moving objects on a set of video sequences;
   choosing a video frame belonging to the track;
   overlaying onto said video frame, the pixels of selected bounding boxes of a tracked object at key positions along the tracks; and
   highlighting a bounding box of the overlaid objects;
   selecting a subset of tracks for training;
   rendering each training track into a composite image;
   labeling each track[s] using the rendered composite image[s] in one shot with an operator;
   training a track classifier by supervised machine learning using the labeled tracks;
   applying the trained track classifier to the remainder of the tracks; and
   selecting tracks classified with a low confidence by the classifier for a subsequent labeling; and
   efficiently labeling video data for training purposes and minimizing operator intervention.

2. The system of claim 1, comprising performing background subtraction to extract the moving objects on each video frame and performing multiple hypotheses tracking to track movement of the moving objects across video frames.

3. The system of claim 1, where the video frame is the one from the middle of the track.

4. The system of claim 1, where the moving objects are selected from the track without overlap between overlaid objects.

5. The system of claim 1, comprising using a graphical user interface (GUI) that displays the rendered composite image of a track and using buttons and keyboard shortcuts for labeling of the track and advancing to the next track to label with a single mouse-click or keystroke.

6. The system of claim 5 where the GUI further comprises a button or keyboard shortcut to go back to the previous track to correct for a labeling mistake.

7. The system of claim 1, where the track classifier comprises an object classifier trained with the object's instance of the tracks, and a track classifier that uses as input features computed in part from the outputs of the object classifier at each frame of the track.

8. The system of claim 7, where the object classifier takes as input multi-scale histogram of Gabor features from the pixels of the bounding boxes of objects.

9. The system of claim 8, where the object classifier is a Support Vector Machine (SVM).

10. The system of claim 8, where the object classifier is a Multi-Layer Perceptron (MLP) with one output per each class of objects.

11. The system of claim 10, wherein the track classifier takes as input feature histograms of the Gaussian-smoothed time-series of each MLP output, and produces one output per each class of object.

12. The system of claim 11, where the track MLP further takes as input geometric features of the track, such as statistics of size, motion and deformation.

13. The system of claim 7, where the object classifier comprises a Convolutional Neural Network (CNN) taking as input pixels of bounding boxes of objects.

14. The system of claim 1, comprising selecting low-confidence tracks by:
   converting the outputs of the classifier to probabilities; and
   selecting tracks for which no output has a high probability.

15. The system of claim 1, where the objective is that no classification produces class probabilities below a threshold.

16. The system of claim 1, where the objective is a given performance level on a validation set.

17. The system of claim 1, where the objective is that a certain percentage of the tracks have been labeled.

18. The system of claim 1, comprising capturing video sequences from fixed cameras.

19. An assisting system of a labeling task, comprising:
   extracting tracks of moving objects on a set of video sequences, the set of video sequences being taken by a fixed camera, the track being movement of a moving object across a field of view of the fixed camera;
   choosing a video frame belonging to the track;
   overlaying onto said video frame, the pixels of selected bounding boxes of a tracked object at key positions along the tracks;
   highlighting a bounding box of the overlaid objects;
   rendering each extracted track into a single composite image, the single composite image representing an entire track;
   accepting an operation for the composite image;
   labeling the entire track represented by the single composite image in response to the operation; and
   providing training data to a training classifier on the basis of the labeled tracks; and
   efficiently labeling video data for training purposes and minimizing operator intervention.

20. The system of claim 19, comprising performing background subtraction to extract the moving objects on each video frame.

21. The system of claim 19, where the operation is a single action.

22. The system of claim 19, where the composite image contains a plurality of bounding boxes, each bounding box representing the moving object.

23. The system of claim 19, where the moving objects are selected from the track without overlap between overlaid objects.

* * * * *